Patented Mar. 12, 1946

2,396,502

UNITED STATES PATENT OFFICE 2,396,502

N-ACYL DERIVATIVES OF AMINOBIPHENYLS

Earl W. Gluesenkamp, Centerville, Ohio, assignor to Monsanto Chemical Company, a corporation of Delaware No Drawing. Application March 23, 1942,
Serial No. 435,835

6 Claims. (Cl. 260—404)

The present invention relates to substitution products of ortho-aminobiphenyl; more particularly, it relates to new derivatives having the general formula:

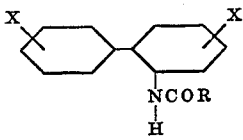

wherein R stands for a saturated or unsaturated aliphatic hydrocarbon radical having from 11 to 27 carbon atoms and X stands for hydrogen, alkyl or a phenyl radical.

The new products vary from viscous liquids to waxy or crystalline solids at room temperature, depending upon the number of carbon atoms in the acyl group or the degree of unsaturation of the acyl group. Some of these derivatives are very valuable as substitutes for the natural waxes, while others find importance as moisture-proofing agents, as plasticizers for use in resins, varnishes, etc., and as intermediates for the preparation of a variety of other organic compounds.

My new products may be prepared in several ways, e. g., by reacting ortho-aminobiphenyl or a phenyl-substituted ortho-aminobiphenyl with a saturated or unsaturated aliphatic mono-carboxylic acid having from 12 to 28 carbon atoms at elevated temperatures under ordinary, decreased, or increased pressure, or by reacting ortho-aminobiphenyl with the acid halides of these acids at approximately room temperature and atmospheric pressure. Technical mixtures of the higher fatty acids, e. g., linseed oil fatty acids and cottonseed oil fatty acids, or the acid halides prepared from such mixtures may be used for the purpose of this invention. In practice, I prefer to operate as follows:

I place ortho-aminobiphenyl or a phenyl-substituted ortho-aminobiphenyl and approximately a molecular equivalent of an aliphatic monocarboxylic acid, e. g., stearic acid into a reaction vessel equipped with an air-condenser, heat the reaction mixture at from 160° to 200° C. for approximately ten minutes at a pressure of 100 mm., decrease the pressure to from 70 to 9 mm., and continue heating the reaction mixture at from 200° C. to 250° C. for from 2 to 24 hours. Upon completion of the reaction I separate the amide from the reaction mass by fractional distillation and purify it by crystallization from an organic solvent, e. g., ethyl alcohol. The use of a partial vacuum during the reaction of the amino compound with the aliphatic monocarboxylic acid is advantageous in that it gives a product of lighter color by reducing oxidation during the reaction and also aids in conversion.

Good results are also obtained by operating under increased pressure, for example, in an autoclave, the use of the closed reaction vessel preventing loss of the amino compound either by volatilization or air-oxidation.

The following examples illustrate a number of ways in which the principle of the invention has been employed, but are not to be construed as limiting the invention:

Example 1

I place 42.5 g. (0.250 mole) of redistilled ortho-aminobiphenyl and 74.2 g. (0.275 mole) of substantially pure stearic acid, M. P. 69° C.–70° C., into a 300 cc. flask equipped with an air condenser. I melt the reactants to a pink liquid and heat them at from 160° C. to 200° C. for 10 minutes under a diminished pressure say of 100 mm. of mercury. Then further heat the reaction mixture at from 200° C. to 205° C. for approximately 6 hours under a pressure of from approximately 70 to 110 mm. of mercury and thereafter allow the reaction mixture to cool while under the partial vacuum. The product is of a light brown color when melted, turning to a dark cream color upon solidifying. 113 g. of the product was distilled in vacuo and two fractions were collected:

(1) Boiling below 238° C. at 2 mm. pressure. This fraction weighed 41.0 g., amounting to 36.15% of the distillation charge. It had a melting point of 45° C.–65° C.

(2) Boiling at from 230° C. to 250° C. at 2 mm. pressure. This fraction weighed 66.6 g. and amounted to 58.6% of the distillation charge, or a 61.39% conversion of the o-aminobiphenyl used in the process. It had a melting point of 77° C.–80° C.

The residue, a brown solid weighing 5.4 g., amounted to 4.8% of the distillation charge.

Fraction 2 was a light cream-colored solid, melting to a very light straw-colored liquid. It was recrystallized from approximately 600 cc. of 95% ethyl alcohol to give 63.4 g. (95% recovery) of a product melting at from 78° C. to 80° C. It was a white, semi-crystalline solid which showed a slight surface yellowing upon drying. Accordingly, in order to obtain a purer product, it was recrystallized by dissolving it in warm 95% ethyl alcohol and permitting the solution to cool slowly. The first crystals appeared at about 45° C., and most of the crystallization occurred at about 38° C., the product forming very large granules which filled the solution. After filtering, the bulky precipitate was pressed down on a suction filter, dried and washed three times with small portions of cold ethyl alcohol and then dried in an oven at about 40° C. The glistening white flakes of the hitherto unknown N-stearoyl-o-aminobiphenyl thus obtained melted at 80° C.–80.5° C. and analyzed as follows:

|  | Acid number | Per cent nitrogen |
|---|---|---|
| Found | 0.28 | 3.21 |
| Calculated | 0.00 | 3.29 |

Example 2

This example makes use of a crude, double-pressed stearic acid. Into a flask equipped with air condenser, I place 422.5 g. (2.5 moles) of ortho-aminobiphenyl and 745 g. (2.75 moles) of the stearic acid and heat the mixture for one-half hour at a temperature of from 160° C. to 200° C. under a pressure of from 80 mm. to 120 mm., and then heat it for 5½ hours at a temperature of from 200° C. to 205° C. under the same pressure. I allow the reaction mixture to cool while under the partial vacuum and obtain as the product a very light brown solid weighing 1131 g. from which the following fractions were collected upon vacuum distillation:

(1) Boiling at 120° C.–190° C. at 1–3 mm. pressure. This fraction weighed 343.2 g., amounting to 30.5% of the distillation charge. It was a white to light yellow solid melting at 30° C.–52° C.

(2) Boiling at 180° C.–230° C. at 0.5 mm. pressure. This fraction weighed 16.5 g., amounting to 1.5% of the distillation charge. It was a light yellow solid, melting at 45° C.–61° C.

(3) Boiling at 220° C.–240° C. at 0.5 mm. pressure. This fraction weighed 395.5 g., amounting to 34.9% of the distillation charge. It was a very light yellow solid, M. P. 53° C.–61° C.

(4) Boiling at 225° C.–259° C. at 0.5 mm. pressure. This fraction weighed 325 g., amounting to 28.5% of the distillation charge. It was a very light yellow solid, M. P. 54° C.–63° C.

(5) Boiling at 245° C.–268° C. at 0.5–1 mm. pressure. This fraction weighed 16.0 g., amounting to 1.4% of the distillation charge. It was a soft yellow solid.

The residue weighed 32.2 g. and amounted to 2.8% of the distillation charge.

Fractions 2, 3 and 4 analyzed as follows:

| Fraction | Neutralization equivalent | Acid number | Per cent nitrogen | Per cent stearic acid |
|---|---|---|---|---|
| 2 | 1,510 | 37.2 | 3.24 | 17.5 |
| 3 | 6,030 | 9.3 | 2.93 | 4.4 |
| 4 | 6,070 | 9.2 | 3.09 | 4.3 |

Fractions 3 and 4, showing high nitrogen content and low stearic acid content amounted to 720.5 g., indicating a 68.4% conversion of the ortho-aminobiphenyl into substantially pure N-stearoyl-o-aminobiphenyl.

Example 3

280 g. of distilled cotton seed oil fatty acids and 169 g. of ortho-aminobiphenyl were heated for 6 hours at 180° C.–200° C. under ordinary atmospheric pressure. The product was vacuum-distilled and the following fractions were collected:

(1) Boiling below 200° C. at 2 mm. pressure: 59.4 g. of light gray solid.

(2) Boiling below 200° C. at 1 mm. pressure: 92.2 g. of light yellow semi-solid.

(3) Boiling at 200° C.–250° C. at less than 1 mm. pressure: 187.3 g. of yellow semi-solid.

Upon analysis, fraction 3 showed a nitrogen content of 2.8% and a neutralization equivalent of 2,246, which indicates a substantial acylation of the ortho-aminobiphenyl by the cottonseed oil fatty acids.

Example 4

169 g. of ortho-aminobiphenyl and 205 g. of distilled coconut oil fatty acids were heated for 6 hours at 160° C.–170° C. 364.6 g. of the product, a dark brown liquid, was poured into a distilling flask and distilled in vacuo. Three fractions were collected:

(1) Boiling below 200° C./2 mm. pressure: 46.5 g. of a white liquid.

(2) Boiling below 190° C. at less than 1 mm. pressure: 198.1 g. of a yellow liquid.

(3) Boiling at 190° C.–220° C. at less than 1 mm. pressure: 93.5 g. of a yellow semi-solid.

Upon analysis, fraction 3 was shown to have a nitrogen content of 3.16% and a neutralization equivalent of 1836.

Example 5

257 g. of linseed oil fatty acids and 155 g. of ortho-aminobiphenyl were heated at 180° C. to 200° C. for 24 hours. The reaction mixture was distilled in vacuo and yielded the following fractions:

(1) Boiling below 225° C. at 4 mm. pressure: 40.7 g. of a red liquid containing a few crystals.

(2) Boiling below 260° C. at 5 mm. pressure: 42.6 g. of a red liquid containing a few crystals.

(3) Boiling below 285° C. (mainly at 280° C.) at 3 mm. pressure: 186.5 g. of a dark red liquid.

Upon analysis, fraction 3 was shown to have a nitrogen content of 2.61 and a neutralization equivalent of 2479.

Example 6

169 g. of ortho-aminobiphenyl and 285 g. of commercial oleic acid were heated at 180° C.–200° C. for 6 hours. The product, a black heavy liquid weighing 417.2 g., was transferred to a distilling flask and vacuum-distilled. The following fractions were collected:

(1) Boiling below 200° C. at 1 mm. pressure: 86.1 g. of a white, crystalline solid and some yellow liquid.

(2) Boiling below 225° C. at 1 mm. pressure: 91.7 g. of light, brown liquid.

(3) Boiling below 260° C. (mainly at 250° C.–257° C.) at 1 mm. pressure: 181 g. of a yellowish brown semi-solid.

Upon analysis, fraction 3 was shown to have a nitrogen content of 2.61% and a neutralization equivalent of 2479.

Example 7

This example shows the use of a phenyl-substituted ortho-aminobiphenyl prepared by reduction of the mono-nitro-m-diphenylbenzene reported by Wardner and Lowy on page 2510 of volume 54 of the Journal of the American Chemical Society for 1932. A 52 g. sample of the phenyl-substituted ortho-aminobiphenyl is dissolved in 250 cc. of dry benzene in a 1-liter, 3-necked flask which is fitted with a reflux condenser, stirrer and 50 cc. dropping funnel. The flask is placed on the water-bath, solution is stirred, and there is added a mixture comprising 35 cc. of dry pyridine and 100 cc. of dry benzene. A solution of stearoyl chloride (prepared by the action of thionyl chloride on 0.20 mole of double-pressed stearic acid) in 50 cc. of dry benzene is then added in the course of 20 minutes. Heat is evolved and a precipitate is formed. The reaction mixture is then treated with 100 cc. of dry benzene and the precipitate becomes crystalline. The resulting suspension is subsequently refluxed, with stirring, for approximately 3 hours, cooled, and the reaction mixture is filtered to remove pyridine hydrochloride. The filtrate is washed with four 100 cc. portions of 10% hydrochloric acid, then with two 100 cc. portions of water and finally with three 200 cc. portions of water in order to remove pyridine. The benzene solution is then dried over anhydrous potassium carbonate, filtered, and most of the benzene removed by distillation under reduced pressure. To the residue there is added 500 cc. of 95% ethyl alcohol and the distillation is continued for a short time to assure complete removal of the benzene. The resulting suspension of oil in alcohol is permitted to cool under vacuum, whereupon the oil becomes pasty and finally crystallizes. The crystals are filtered off, washed with a little alcohol and dried. The filtrate is concentrated, cooled under vacuum and a smaller amount of crystals was isolated as before. This was combined with the first crop to give 85 g. (85% yield based on the amino compound) of a light-brown, wax-like material which melts at from approximately 45° C. to 60° C.

The use of crude fatty acid mixtures as shown in some of the above examples results in the production of mixtures of N-acyl derivatives of ortho-aminobiphenyl or phenyl substituted ortho-aminobiphenyl, which mixtures are of definite commercial interest as substitutes for the natural waxes in the formulation of shoe polishes, etc., as plasticizers for use in resins, or as moisture-proofing agents. The use of the comparatively inexpensive technical fatty acids according to the process of the present invention therefore offers an economical method for the production of materials having a wide range of applicability in industry. For some purposes however, i. e., where products of high purity and definite composition are required, the technical mixtures of higher fatty acids used in the above examples may be substituted by pure or substantially pure saturated or unsaturated aliphatic monocarboxylic acids having from 12 to 28 carbon atoms such as lauric-, myristic-, palmitic-, oleic-, linoleic-, or erucic acid or the corresponding acid halides to give pure or substantially pure N-lauroyl-, N-myristoyl-, N-palmitoyl-, N-oleoyl-, N-linoleoyl- or N-erucoyl-o-aminobiphenyl, respectively, the isolation of the pure N-acyl derivative being effected, say, as in Example 1.

Inert solvents may be used in the condensation in order to obtain a more homogeneous mixture; such solvents as benzene or carbon tetrachloride and the like being suitable in reactions effected with the acyl halides and the higher boiling solvents such as tetralin being useful in condensations effected with the acids or the technical mixtures thereof.

It is apparent to one versed in the art that variation can be made in the temperature, conditions of operation, etc., set forth in the above examples without departing from the spirit of the invention, the scope of which is limited only by the following claims.

What I claim is:

1. The process for producing a substance having from a highly viscous to a wax-like consistency, which comprises condensing a compound having the formula:

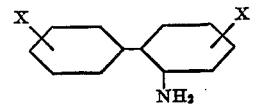

where the substituents X are selected from the class consisting of hydrogen and not more than one phenyl radical, with a fatty acid having from 12 to 28 carbon atoms.

2. The process for producing a substance having from a highly viscous to a wax-like consistency, which comprises condensing a compound having the formula:

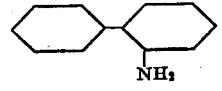

with a fatty acid having from 12 to 28 carbon atoms.

3. The process according to claim 2 in which the acid is stearic acid.

4. The process according to claim 2 in which the acid is oleic acid.

5. The process according to claim 2 in which the acid is palmitic acid.

6. A substance having from a highly viscous to a wax-like consistency and having the formula:

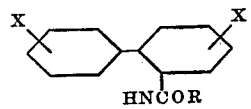

where R is a carbon chain of from 11 to 27 carbon atoms and the substituents X are selected from the class consisting of hydrogen and not more than one phenyl radical.

EARL W. GLUESENKAMP.